United States Patent [19]

Beardsley et al.

[11] Patent Number: 5,530,829
[45] Date of Patent: Jun. 25, 1996

[54] TRACK AND RECORD MODE CACHING SCHEME FOR A STORAGE SYSTEM EMPLOYING A SCATTER INDEX TABLE WITH POINTER AND A TRACK DIRECTORY

[75] Inventors: Brent C. Beardsley; Susan K. Candelaria; Vern J. Legvold; Peter L. Leung; Douglas A. Martin; Gail A. Spear, all of Tucson, Ariz.

[73] Assignee: International Business Machines Corporation, Armonk, N.Y.

[21] Appl. No.: 993,249

[22] Filed: Dec. 17, 1992

[51] Int. Cl.[6] ................................................. G06F 12/08
[52] U.S. Cl. .................. 395/440; 395/403; 395/497.01; 364/DIG. 1; 364/243.41; 364/256.3
[58] Field of Search ................................... 395/425, 400, 395/403, 497.01, 440, 415–419, 421.06; 364/200 MS File, 900 MS File

[56] References Cited

U.S. PATENT DOCUMENTS

| | | | |
|---|---|---|---|
| 4,403,288 | 9/1983 | Christian et al. | 395/825 |
| 4,574,346 | 3/1986 | Hartung | 395/444 |
| 4,636,946 | 1/1987 | Hartung et al. | 395/463 |
| 4,875,155 | 10/1989 | Iskiyan et al. | 395/440 |
| 4,882,642 | 11/1989 | Tayler et al. | 360/78.11 |
| 5,235,690 | 8/1993 | Beardsley et al. | 395/440 |
| 5,235,692 | 8/1993 | Ayres et al. | 395/849 |
| 5,269,019 | 12/1993 | Peterson et al. | 395/600 |
| 5,283,884 | 2/1994 | Menon et al. | 395/440 |
| 5,381,539 | 1/1995 | Yanai et al. | 395/460 |

*Primary Examiner*—Matthew M. Kim
*Attorney, Agent, or Firm*—Benman, Collins & Sawyer

[57] ABSTRACT

A system and technique for storing data in a cache memory in record format and in track format. Space is allocated in cache memory for the storage of data in track format. Additional space is allocated for the storage of data in record format. Data is stored in both formats. The most current data is identified and addresses are generated for each record of data. Access to individual records of data is facilitated through a track information block in which pointers are stored for the most current records whether stored in track format or record format. The track information block facilitates a rapid storage and retrieval of data in either format. In a specific implementation, data is stored in either format in cache using a scatter index table. The scatter index table and associated track directory entries are stored in a shared control array. Each track directory entry points to a track slot header in a cache. The track slot header points to an area (segment) in the cache memory in which selected data resides. The track slot header also points to a track information block associated with the selected segment. The track information block identifies the location selected records in the segment in track format or record format.

20 Claims, 6 Drawing Sheets

TRACK AND RECORD MODE CACHING SCHEME FOR A STORAGE SYSTEM EMPLOYING A SCATTER INDEX TABLE WITH POINTER AND A TRACK DIRECTORY

BACKGROUND OF THE INVENTION

1. Field of the Invention

The present invention relates to computing systems. More specifically, the present invention relates to storage devices and systems for use with computing systems.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

In large distributed computing systems, a plurality of host computers are typically connected to a number of direct access (permanent) storage devices (DASDs), such as a tape or disk drive unit, by a storage controller. Among other functions, the storage controller handles connection and disconnection between a particular computer and a DASD for transfer of a data record. In addition, the storage controller stores data in electronic memory for faster input and output operations.

The IBM Model 3990 storage controller, is an example of a storage controller which controls connections between magnetic disk units and host computers. The host computers are typically main frame systems such as the IBM 3090, the Model ES9000, or other comparable systems.

The IBM 3990 Model 3 type controller can handle up to sixteen channels from host computers and up to sixty-four magnetic storage units. The host computers are connected to storage controller by at least one and by up to four channels. The storage controller typically has two storage clusters, each of which provides for selective connection between a host computer and a direct access storage device and each cluster being on a separate power boundary. The first cluster might include a multipath storage director with first and second storage paths, a shared control array (SCA) and a cache memory. The second cluster typically includes a second multipath storage director with first and second storage paths, a shared control array and a non-volatile memory (NVS). Thus, each storage path in the storage controller has access to three addressable memory devices for supporting storage controller operation: non-volatile memory; shared control array; and cache.

Nonvolatile storage (NVS) serves as a backup to the cache for the buffering function.

A shared control array (SCA) is a memory array which is shared over all storage paths.

Cache is best known for its application as an adjunct to computer memory where it is used as a high speed storage for frequently accessed instructions and data. The length of time since last use of a record is used as an indicator of frequency of use. Cache is distinguished from system memory in that its contents are aged from the point of time of last use. In a computer memory address space, program data has to be released before data competing for space in the address space gains access. In cache, competition for space results in data falling out of the cache when they become the least recently used data. While infrequently accessed data periodically enter cache, they will tend to "age" and fall out of cache. Modified data in cache is duplicated in nonvolatile memory. Storage controller cache performs an analogous function for direct access storage devices and storage controllers. Reading data from (and writing data to) the magnetic media of the direct access storage devices is fairly time consuming. Among the factors slowing the read and write operations are time required for the magnetic disk to bring a record location into alignment with a transducer and the limited bandwidth of the magnetic transducer used to read and write the data. By duplicating frequently accessed data in cache, read time for data is reduced and data storage system throughput is considerably enhanced.

DASD caches were originally designed to store a track of data at a time. Often, the following track of data of the DASD is brought into cache for as a prediction as to what data would be accessed next. This increases performance for track caching systems. Unfortunately, this scheme impairs performance for record caching systems such as database type systems as the resources of the control unit, cache and DASD are used to bring in data that may not be used by the system. In addition, the storage of whole tracks images of data is inefficient.

As a result, record caching was developed and found to be more suitable for databases and other record oriented applications. The caching of records reduces internal fragmentation in the cache at the expense of greater complexity in the data structures required.

However, as certain performance advantages accompany each caching format, there are applications in which it is desirable to operate a record mode cache in track mode. That is, in a storage control unit that supports both track and record caching, conditions occur where records exist in cache and a full track is desired. Unfortunately, the switch to track caching will cause a performance impact if the control unit must disconnect from the channel, destage (unload) all modified data from record slots for the track, free the record slot cache space and allocate new space in the cache for a track slot before continuing with the disconnected channel command program. Hence, the operation of a record mode cache in track mode is problematic.

The conventional approach to the problem is to write modified data from the cache to the drive and then read data back from the drive to the cache in track mode. However, this scheme is slow, requiring two revolutions of the drive for each operation. In certain applications, where frequent track caching operations are required, the slow speed of this approach imposes a significant limitation on the performance of the system.

Thus, there is a need in the art for an improved track and record mode caching scheme for a storage control unit.

SUMMARY OF THE INVENTION

The need in the art is addressed by the system and technique of the present invention for storing data in a cache memory in record format and in track format. In accordance with the inventive technique, space is allocated in cache memory for the storage of data in track format. Additional space is allocated for the storage of data in record format. Data is then stored in both formats. The most current data is identified and addresses are generated for each record of data. Access to individual records of data is facilitated through a track information block in which pointers are stored for the most current records whether stored in track format or record format. The track information block facilitates a rapid storage and retrieval of data in either format.

In a specific implementation, data is stored in either format in cache using a scatter index table. The scatter index table and associated track directory entries are stored in a shared control array. Each track directory entry points to a track slot header in a cache. The track slot header points to an area (segment) in the cache memory in which selected data resides. The track slot header also points to a track information block associated with the selected segment. The track information block identifies the location of selected records in the segment in track format or record format.

DESCRIPTION OF THE INVENTION

Illustrative embodiments and exemplary applications will now be described with reference to the accompanying drawings to disclose the advantageous teachings of the present invention.

Figure 1:
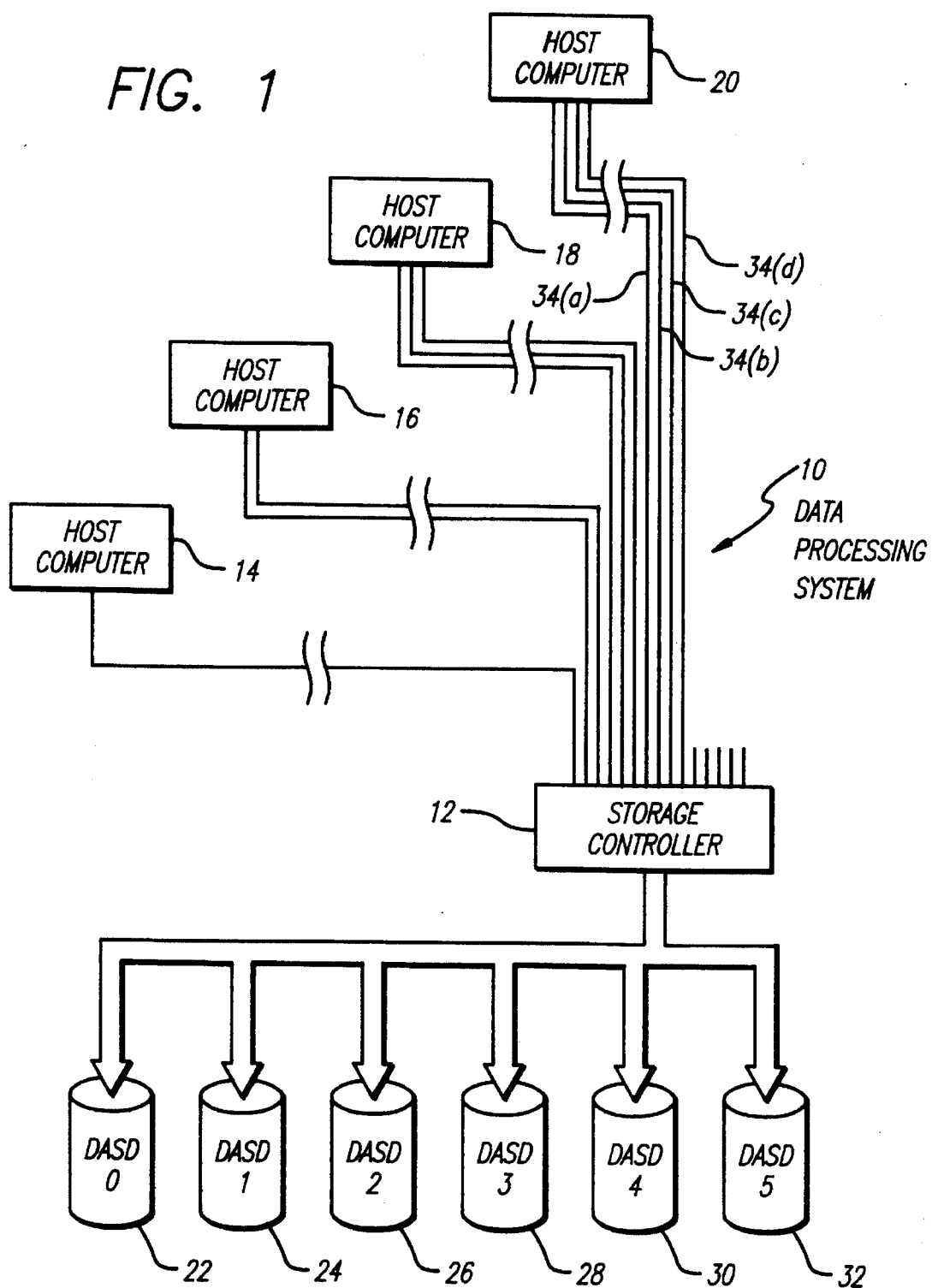
FIG. 1 is a high level block diagram of a data processing system.

FIG. 1 is a high level block diagram of a data processing system 10. The system 10 includes a storage controller 12, a plurality of host computers 14, 16, 18 and 20 and a plurality of direct access storage devices (DASD) 22–32. Presently, disk drive units are the most common type of DASD. In large multiple computer data processing systems, a large number of direct access storage devices serve several computers.

The storage controller 12 is logically positioned between the host computers 14–20 and the DASDs 22–32. The storage controller 12 handles connection and disconnection between a particular computer and magnetic disk unit for transfer of a data record.

The IBM Model 3990 storage controller, is an example of a storage controller used to control connections between magnetic disk units and host computers. The host computers 14–20 are typically main frame systems such as the IBM 3090, the Model ES9000, or other comparable systems.

The IBM 3990 Model 3 type controller can handle up to sixteen channels from host computers and up to sixty-four magnetic storage units. Hence, the host computers 14–20 are connected to storage controller 12 by at least one and by up to four channels. For example, the host computer 20 is connected to storage controller 12 by channels 34(a), 34(b), 34(c) and 34(d). Although four host computer systems and six direct storage devices are depicted in FIG. 1, the storage controller 12 can handle additional channels and direct access storage devices.

Figure 2:
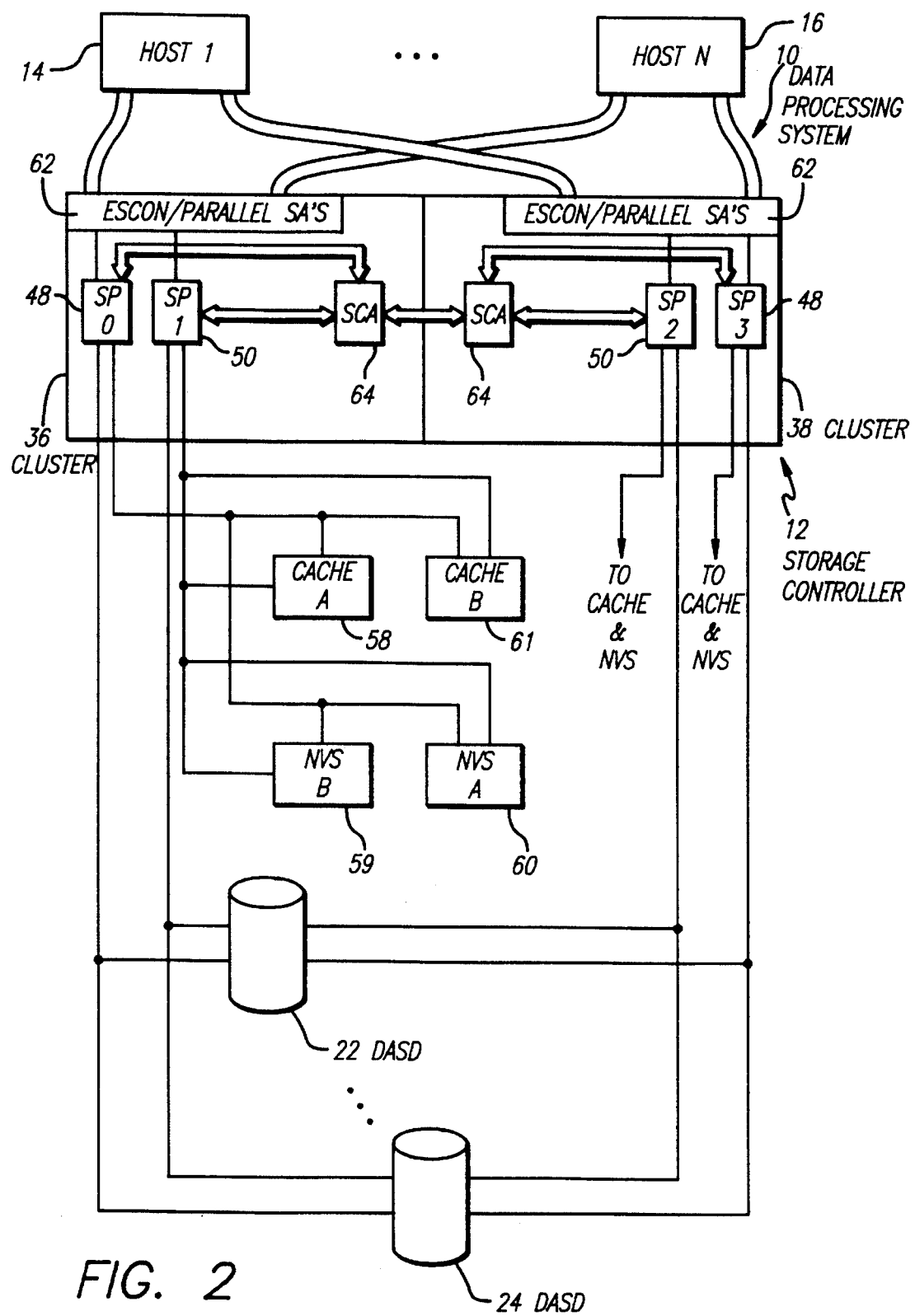
FIG. 2 depicts the storage controller of the data processing system of the present invention.

FIG. 2 depicts the storage controller 12 in greater detail. The storage controller 12 has two storage clusters 36 and 38, each of which provides for selective connection between a host computer and a direct access storage device. The clusters 36 and 38 are on separate power boundaries. Each cluster includes a first multipath storage director 62 with associated storage paths 48 and 50, and a shared control array (SCA) 64. The shared control arrays 64 of each cluster are interconnected. First and second cache memories (Cache A) 58 and (Cache B) 61 respectively, and first and second nonvolatile memories (NVS B) 59 and (NVS A) 60, respectively are provided. Each storage path of each cluster is connected to each cache memory and each nonvolatile memory for optimum reconfigurability as discussed herein. Data written to Cache A 58 is backed up in cross-paired nonvolatile memory NVS A 60. Likewise, data written to Cache B is backed up in cross-paired nonvolatile memory NVS B.

Figure 3:
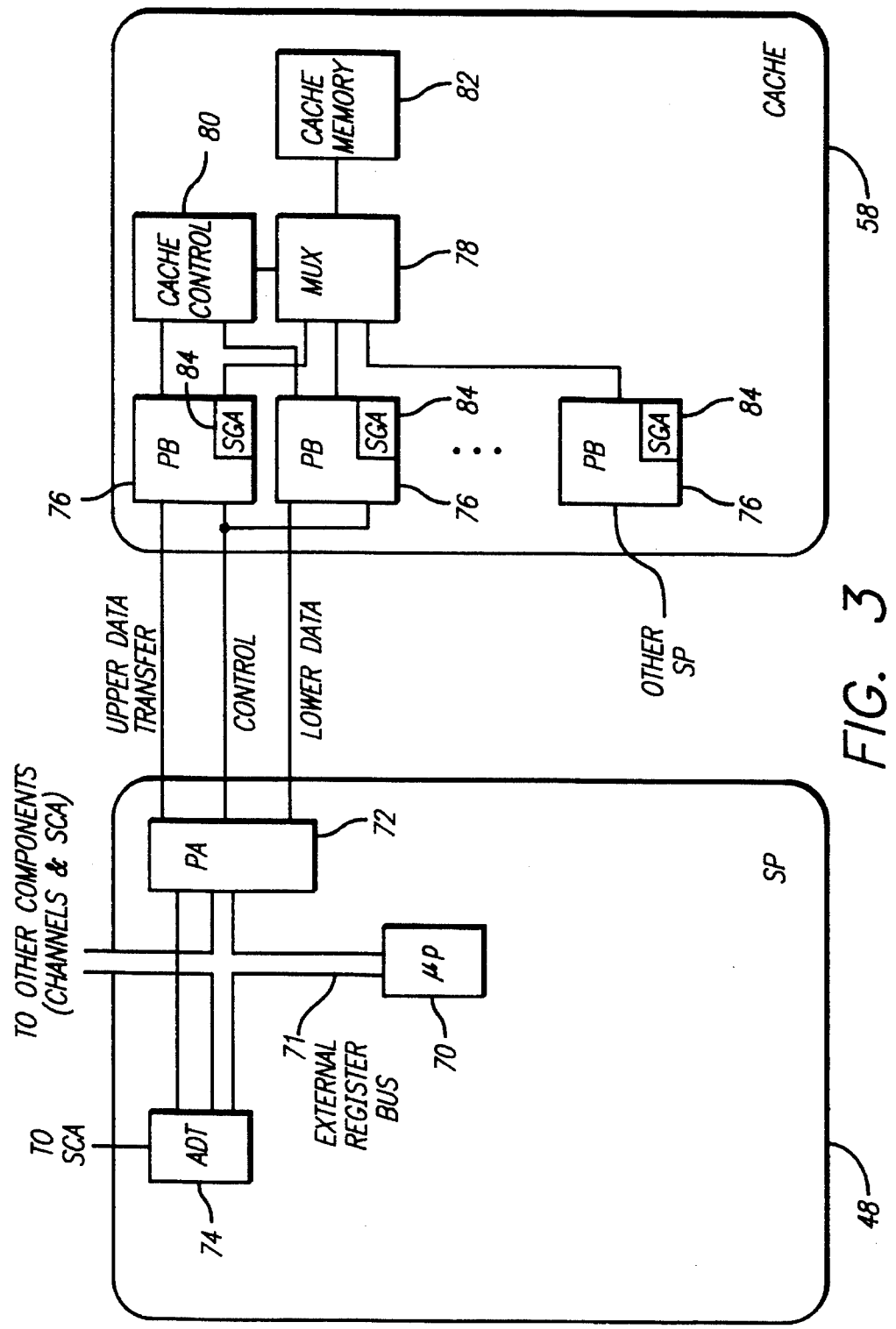
FIG. 3 is a block diagram of a storage path and a cache of the storage controller of the data processing system of the present invention.

FIG. 3 is a block diagram of a storage path and a cache of the storage controller of the data processing system of the present invention. The storage path 48 is connected to a multipath storage director 62 (not shown) as illustrated in FIG. 2. Data transfer between the storage path 48 and one of the direct access storage devices during synchronous operations occurs via an automatic data transfer circuit 74. A port adapter 72 controls transfer of data between the cache memories 58 and 61, the nonvolatile memories 59 and 60 and DASD devices of which only the first cache memory 58 is shown.

All operations of the storage path 48 are under control of a microprocessor 70. Processor control microcode is executed by the microprocessor in the storage path to control the operation of the storage controller. Hence, while each storage path is, in effect, a stand alone control unit based upon its own microprocessor, the storage paths share processor control information through the SCA 64 (FIG. 2) for synchronization functions for handling connections, disconnections and reconnections relating to a transaction. Any scheme may be used to effect the connections and disconnections. U.S. patent application entitled USE OF CONFIGURATION REGISTERS TO CONTROL ACCESS TO MULTIPLE CACHES AND NONVOLATILE STORES, Ser. No. 08/386,602, filed Feb. 10, 1995 which is continuation of U.S. patent application Ser. No. 07/992,368, filed Dec. 17, 1992, now abandoned, B. C. Beardsley, et al., (IBM Docket TU992-074), the teachings of which are incorporated herein by reference, discloses a particularly advantageous technique for effecting the necessary connections and disconnections.

Processor control signals are distributed over an external register bus 71. Control signals to implement the present invention are provided to the cache memories 58 and 61 by way of the external register bus, configuration registers in the port adapter 72, and a plurality of port buffers 76 in each cache unit. Plural port buffers are provided to match the data transfer speed out of the port adapter 72.

In addition to the port buffers 76, each cache unit 58, 61 includes a multiplexer 78 and a control circuit therefor 80. The control circuit 80 is logic which controls the transfer of data between the port buffers 76 and the cache memory 82 through the multiplexer 78.

A novel aspect of the present invention is the provision of segment array (SGA) logic 84 in each of the port buffers. The segment array logic is a circuit custom designed to implement the address generation scheme of the present invention by which a single cache unit handles data storage and transfer in track mode as well as data mode as set forth more fully below. Those skilled in the art will be able to design a segment array circuit to practice the present invention using conventional circuit design techniques.

The microprocessor 70 loads the SGA logic circuit 84 of each port buffer with data via a register in each port buffer (not shown). The microprocessor 70 also determines the addressing scheme (virtual or real) and addresses data using the selected format.

Figure 4:
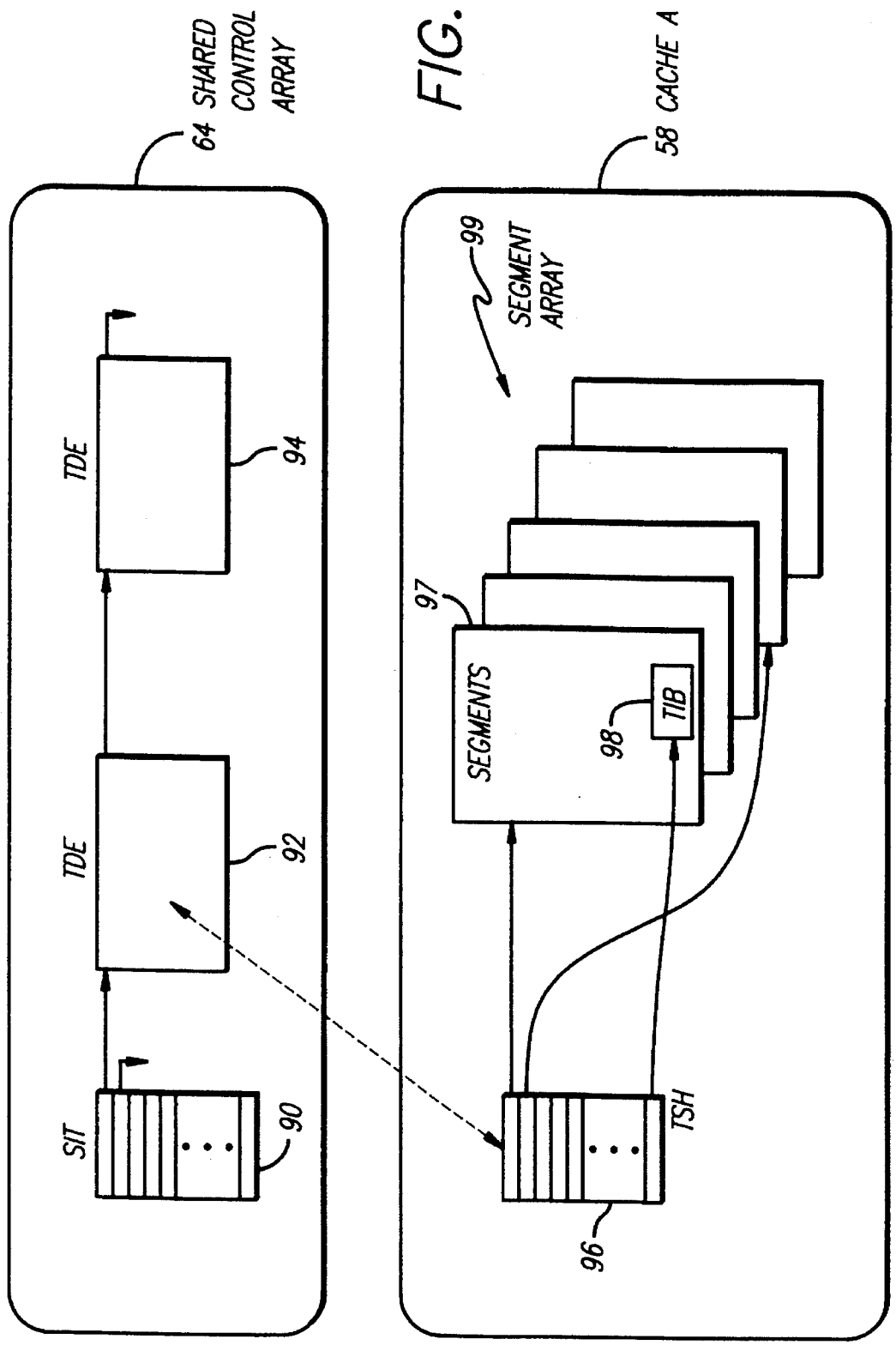
FIG. 4 shows the data structures used to determine the format of data stored in cache in accordance with the teachings of the present invention.

FIG. 4 shows the data structures used to determine the format of data stored in cache in accordance with the teachings of the present invention. As discussed more fully in U.S. patent application entitled DYNAMIC RECORD CACHING ALLOCATION, Ser. No. 07/949,669, filed Sep. 23, 1992, by Beardsley et al., the teachings of which are incorporated herein by reference, these data structures provide an indication as to what tracks are in cache, which cache and where in cache. The data structures are split between the shared control array(s) and cache. The structure of the various types of directory entries is determined by the segmented nature of the cache. The cache is typically currently divided into 16 kilobyte segments. The segmentation functions are provided by the SGA logic 84 of FIG. 3 which allows for data records to span segments.

As the present invention is directed to the problem of caching tracks of data in a data structure initially set up to cache tracks of data, the caching of records need not be described in detail here. Record caching may be performed in a conventional manner or in accordance with the teachings of the above-referenced copending application entitled DYNAMIC RECORD CACHING ALLOCATION. In any event, the following disclosure will focus on the caching of tracks in a record oriented cache.

In the preferred embodiment, in the shared control array 64, a scatter index table (SIT) 90 is used to quickly determine whether particular items of data exist in cache. Data is hashed into the scatter index table using device and slot numbers as keys. Hashing is performed in accordance with any of a number of conventional algorithms that serve to compress data. Every entry that hashes to a particular number is listed as an entry at that number in the scatter index table. All tracks that hash to the same number share a hash chain or a collision chain.

Each entry in the scatter index table 90 points to a track directory entry (TDE) table 92. The track directory entry table 92 is an index into a given track. The TDE contains a device identification number (ID), a track number (cylinder and head), a hash collision pointer for other entries such as the TDE 94 that hash to the same number in the SIT table 90, and a least recently used (LRU) pointer. One TDE is provided for every track in cache. In FIG. 4, it is evident that two tracks in cache hash to the same number in first location of the scatter index table. The second location in the SIT table is grounded to indicate that no tracks hash to that value.

There is a one-to-one correlation between each TDE and a track slot header (TSH) in cache. In addition, there is one TSH for every segment in cache. Thus, for each track of DASD data, a separate segment is allocated in cache. In the preferred embodiment, for each TDE 92 the corresponding TSH may be calculated to conserve space in memory. In the alternative, a pointer may be stored in the TDE to the associated TSH.

FIG. 4 shows a TSH 96 stored in cache 58 corresponding to a first TDE 92 in the shared control array 64. The TSH 96 contains segment addressing entries and address control information. That is, the TSH 96 has pointers to the various segments in cache memory allocated to the track and a pointer to a control block in memory called a track information block or TIB. The track information block identifies the location of selected records in the segment.

The TSH 96 is loaded into an SGA 84 by the microprocessor 70 of each storage path (FIG. 2.). This sets up the addressability of each segment. The TSH 96 points to a particular segment 97 for the track information block 98 associated with the track in a segment array 99.

Figure 5:
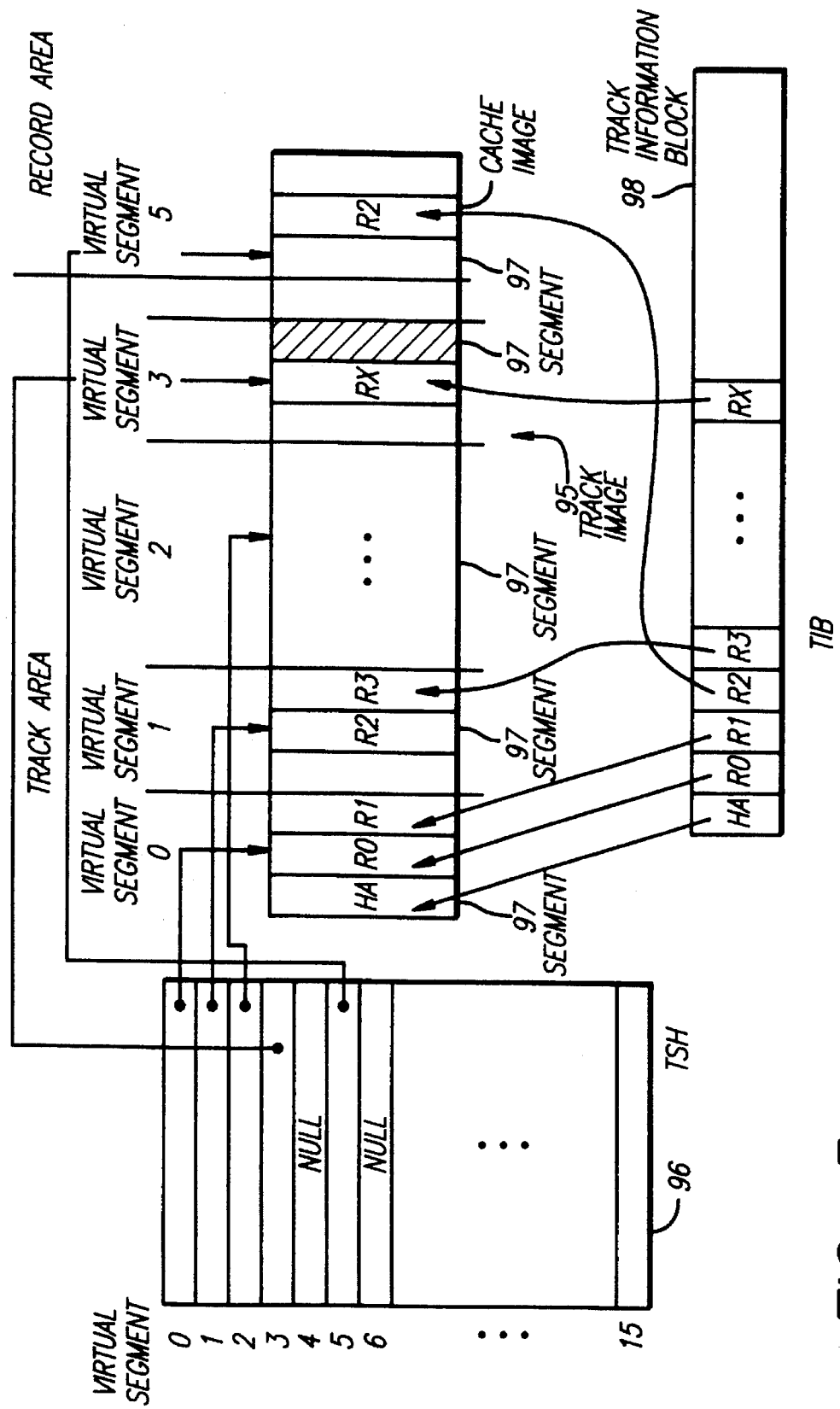
FIG. 5 illustrates the relationship between the track slot header, the associated segment and track information block.

FIG. 5 illustrates the relationship between the track slot header 96, the associated segment 97 and track information block 98. In accordance with the present teachings, the segment 97 is broken up into several virtual segments 0–15. The first five virtual segments Segments 0–4 are reserved or allocated for the track image for track mode or track format caching. Thus, the home address HA of the track, record 0 of the track R0, and records R1–Rx, the last record in the track, are stored in the first four virtual segments of the track image 95. (A track image consists of multiple segments.)

The sixth through fifteenth virtual segments Segments 5–14 are allocated to the record image for record mode or record format caching. In this case, record 2, $R_2$, is stored in the record image as a modified record. In FIG. 5, the seventh through fifteenth virtual segments do not exist and are null. The sixteenth virtual segment (Segment 15) is a pointer to the track information block 98, an area in memory which stores a header and a pointer for each record in the segment.

In addition to the cache address of each record, the TIB contains the NVS address of all DASD modified data, modified indications, and the angular position of each record on the track. The TIB 98 is ordered in the same format as a physical track. The table below illustrates the structure of a TIB for a given track on a given device:

TABLE I

| Record | Cell # | Flags | Cache Addr. | NVS Addr. |
|--------|--------|-------|-------------|-----------|
| HA | 2 bytes | 2 bytes | 2 bytes | 3 bytes |
| R0 | " | " | " | " |
| R1 | " | " | " | " |
| . | . | . | . | . |
| . | . | . | . | . |
| . | . | . | . | . |
| Rx | " | " | " | " |

As shown in FIG. 5, a pointer is provided in the TIB for every record in the track except for records, such as R2, that are in the most current image (modified). That is, when data is staged from the DASD, the track records pointers are placed in the TIB with the exception of pointers to modified record data. As records are placed in record slots, the addresses of the segments containing these records are placed in entries 5–14 of the track slot header and the record slot TIB is updated to address each record. When a track slot is required, five cache segments are allocated and their addresses are placed in entries 0–4 of the track slot header. An asynchronous task is created to roll mode stage the track (i.e., select the physical without orientation and stage past index) until the entire track is in cache. A TIB for the track slot is built in one of the segments allocated to the track slot. Before writing the track slot TIB, the record slot TIB is read and the data for all modified records is copied to the track slot TIB.

Data is segmented in cache in accordance with a virtual addressing scheme in order to allow individual records to span several segments.

Figure 6:
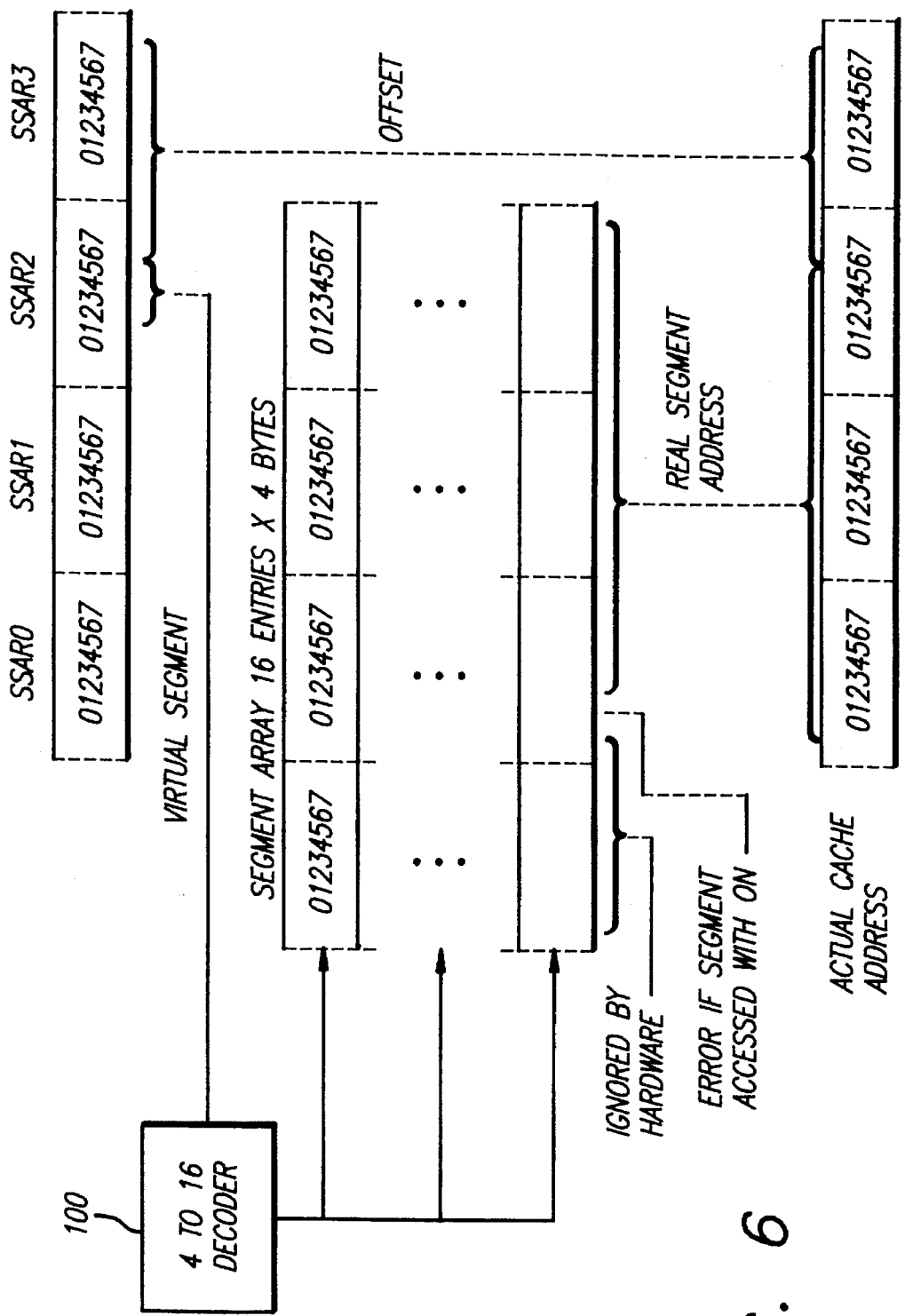
FIG. 6 illustrates how data is segmented in cache in accordance with the teachings of the present invention.

FIG. 6 illustrates how data is segmented in cache in accordance with the teachings of the present invention. Real mode address data is read into SSAR registers 0–3. To construct a virtual address, data in the first and second SSAR registers and the first two bits of the third register are ignored. The third, fourth, fifth and sixth bits of the third register are used by a 4 to 16 decoder 100 to select one of 16 segment entries in the segment array in memory 82 of FIG. 3. The last 22 bits of the four byte selected segment entry are used to provide a real segment address. One bit is used to indicate segment validity. The remaining bits are ignored. The segment address is supplemented by an offset consisting of the last two bits of the third SSAR register and the eight bits of the fourth SSAR register to provide the actual cache address used to address the memory 82. Hence, a 14 bit virtual address is used to scatter data over a large area of cache.

Thus, the present invention operates as follows. A predetermined number of segment entries (e.g. five) in the track slot header are reserved for the track slot. A number of entries (e.g. 10) are reserved for record caching. When modified record slots exist and a channel command word is received that requires track caching, the storage path will do the following:

1. allocate a track slot;
2. disconnect from the channel with channel command retry status;
3. stage the track into the cache; and
4. update the TIB for the track slot to point to the modified record in record slots.

When modified data exist and a channel command word chain other than a track processing facility backup chain is received that requires track caching, the control unit frees the record slots and allocates a track slot. For a backup request, a track slot is allocated but the record slots are not invalidated. The track slot is invalidated after the track is transferred to the channel and the record slots remain in the cache.

Wasted space may occur when records exists in both track and record slots. The segments containing record slots can be freed by one of the following algorithms:

1. Create an asynchronous task to copy the modified record slots to the track slots, update the track slot TIB and free the cache space used for record slots.
2. Wait until the modified record slots are written. As each record is written, the new data is written to the track slot and the cache space for the record slot is freed.

After a backup operation for the track, the track segments 0–4 are freed and the original record slots remain.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention. Accordingly,

What is claimed is:

1. A system for storing data in a cache memory in record format and in track format, said system comprising:

first means for allocating space in said cache memory for the storage of data in said cache in track format;

second means for allocating space in said cache memory for the storage of data in record format;

third means for storing at least one record of data in said cache in record format for caching said at least one record of data as arranged in a database system;

fourth means for storing at least one record of data in said cache in track format for caching said at least one record of data as arranged in a direct access storage device;

fifth means for identifying most current data in said records stored in said record format and said track format and generating addresses for selectively accessing said most current data in either record format or track format; and sixth means for storing pointers to said addresses.

2. The system of claim 1 including means for generating a scatter index table for storing data in either format in cache.

3. The system of claim 2 further including means for hashing said scatter index table.

4. The system of claim 2 including means for generating a track directory entry from said scatter index table.

5. The system of claim 4 further including means for storing said scatter index table and a track directory entry in a second memory.

6. The system of claim 4 wherein said track directory entry points to a track slot header in said cache.

7. The system of claim 6 wherein said track slot header points to a segment in said cache memory in which selected data resides.

8. The system of claim 7 wherein said segment is stored in a segment array.

9. The system of claim 8 wherein said segment array is generated by segment array logic.

10. The system of claim 9 wherein said segment array logic is implemented in a port buffer in said cache.

11. The system of claim 7 wherein said track slot header also points to an area in said cache memory in which a track information block is stored.

12. The system of claim 11 wherein said track information block identifies a location of selected records in said segment.

13. The system of claim 12 wherein said track information block identifies a location of selected records in said segment in track format.

14. The system of claim 12 wherein said track information block identifies a location of selected records in said segment in record format.

15. A system for storing data in a cache memory in record format and in track format said system comprising:

first means for allocating space in said cache memory for the storage of data in said cache in track format;

second means for allocating space in said cache memory for the storage of data in record format;

third means including a scatter index table for storing a first record of data in said cache in record format, said scatter index table including pointer to a track directory entry for said first record of data, said track directory entry pointing to a track slot header in said cache and said track slot header pointing to a first segment in said cache memory in which selected data resides in record format, said track slot header also pointing to an area in said cache memory in which a track information block is stored, said track information block identifying a location of selected records in said segment;

fourth means including said scatter index table for storing a second record of data in said cache in track format, said scatter index table including pointer to a track directory entry for said second record of data, said track directory entry pointing to a track slot header in said cache and said track slot header pointing to a second segment in said cache memory in which selected data resides in track format, said track slot header also pointing to an area in said cache memory in which a second track information block is stored, said second track information block identifying the location of selected records in said segment;

fifth means for identifying most current data in said records stored in said record format and said track format and generating addresses therefor; and sixth means for storing pointers to said addresses.

16. The system of claim 15 further including means for storing said scatter index table and an associated track directory entry in a shared control array.

17. The system of claim 16 wherein said first and second segments are stored in a segment array.

18. The system of claim 17 wherein said segment array is generated by segment array logic.

19. The system of claim 18 wherein said segment array logic is implemented in a port buffer in said cache.

20. A method for storing data in a cache memory in record format and in track format, said method comprising:

allocating space in said cache memory for the storage of data in said cache in track format;

allocating space in said cache memory for the storage of data in record format;

storing at least one record of data in said cache in record format for caching said at least one record of data as arranged in a database system;

storing at least one record of data in said cache in track format for caching said at least one record of data as arranged in a direct access storage device;

identifying most current data in said records stored in said record format and said track format and generating addresses for selectively accessing said most current data in either record format or track format; and storing pointers to said addresses.

* * * * *